United States Patent [19]

Degen et al.

[11] 4,256,458
[45] Mar. 17, 1981

[54] METHINE DYES FOR PAPER AND AMONICALLY-MODIFIED FIBERS

[75] Inventors: Hans-Juergen Degen, Lorsch; Franz Feichtmayr, Ludwigshafen; Klaus Grychtol, Bad Durkheim, all of Fed. Rep. of Germany

[73] Assignee: BASF Aktiengesellschaft, Ludwigshafen, Fed. Rep. of Germany

[21] Appl. No.: 50,527

[22] Filed: Jun. 21, 1979

Related U.S. Application Data

[62] Division of Ser. No. 964,148, Nov. 28, 1978, abandoned.

[30] Foreign Application Priority Data

Dec. 7, 1977 [DE] Fed. Rep. of Germany ....... 2754403

[51] Int. Cl.³ .................... D21H 1/46; C07D 213/04
[52] U.S. Cl. ................................ 8/506; 8/655; 542/402; 542/476; 546/255; 546/256
[58] Field of Search .................... 8/7, 168 R; 546/255

[56] References Cited

U.S. PATENT DOCUMENTS

| 2,461,137 | 2/1949 | Brooker | 542/434 |
| 2,465,412 | 3/1949 | Wilson | 546/255 |
| 3,567,453 | 3/1971 | Borden | 542/412 |
| 4,053,606 | 10/1977 | Shen et al. | 546/261 |

FOREIGN PATENT DOCUMENTS 622272 4/1949 United Kingdom .
844767 8/1960 United Kingdom .

Primary Examiner—A. Lionel Clingman
Attorney, Agent, or Firm—Oblon, Fisher, Spivak, McClelland & Maier

[57] ABSTRACT

Methine dyes of the general formula

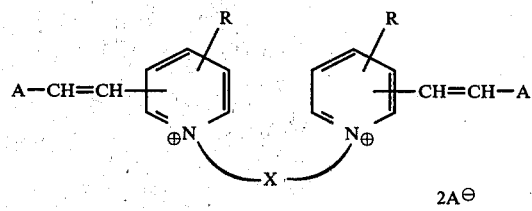

where the groups A are identical or different aryl or hetaryl, A⊖ is an anion, R is hydrogen, methyl or ethyl and X is a bridge member, and the methine groups are in the α- or γ-position. The compounds are preferably used for dyeing paper.

2 Claims, No Drawings

METHINE DYES FOR PAPER AND AMONICALLY-MODIFIED FIBERS

This is a division of application Ser. No. 964,148, filed Nov. 28, 1978, now abandoned.

BACKGROUND OF THE INVENTION

Field of the Invention

This invention relates to a method of dyeing paper and anionically modified fibers using methine dyes.

SUMMARY OF THE INVENTION

The present invention relates to compounds of the general formula I

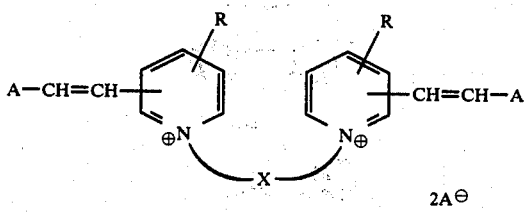

where the groups A are identical or different aryl or hetaryl, A⊖ is an anion, R is hydrogen, methyl or ethyl and X is a bridge member, and the methine groups are in the α- or γ-position.

DESCRIPTION OF THE PREFERRED EMBODIMENTS

Examples of radicals A are phenyl which is unsubstituted or substituted by fluorine, chlorine, bromine, cyano, nitro, hydroxyl, alkoxycarbonyl, carbamyl (which is unsubstituted or N-substituted), alkyl, alkoxy, amino or substituted amino, naphthyl which is unsubstituted or substituted by alkyl, alkoxy, hydroxyl, carboxyl or substituted amino, and styryl, furyl, thienyl, pyridyl, indolyl, benzofuryl, benzothienyl, pyrazolyl, oxazolyl, thiazolyl, triazolyl, oxdiazolyl, thiadiazolyl, benzimidazolyl, indazolyl, benzoxazolyl, benzthiazolyl, carbazolyl, phenthiazinyl and phenoxazinyl, which radicals are unsubstituted or substituted by alkyl, alkoxy, hydroxyl, carboxyl or substituted amino.

Specific examples of radicals A are chlorophenyl, bromophenyl, cyanophenyl, nitrophenyl, methoxycarbonylphenyl, ethoxycarbonylphenyl, hydroxyphenyl, aminocarbonylphenyl, dimethylaminocarbonylphenyl, diethylaminocarbonylphenyl, methylphenyl, ethylphenyl, cyclohexylphenyl, phenylphenyl, methoxyphenyl, ethoxyphenyl, butoxyphenyl, phenoxyphenyl, aminophenyl, methylaminophenyl, ethylaminophenyl, benzylaminophenyl, butylaminophenyl, phenylaminophenyl, cyanoethylaminophenyl, dimethylaminophenyl, dimethylaminochlorophenyl, dimethylaminomethylphenyl, dimethylaminomethoxyphenyl, dimethylaminonitrophenyl, dimethylaminocarbomethoxyphenyl, diethylaminophenyl, ethoxydiethylaminophenyl, dipropylaminophenyl, di-n-butylaminophenyl, dibenzylaminophenyl, di-β-cyanoethylaminophenyl, di-β-methoxyethylaminophenyl, N-methyl-N-ethylaminophenyl, N-butyl-N-methylaminophenyl, N-methyl-N-benzylaminophenyl, N-ethyl-N-methoxybenzylaminophenyl, N-cyclohexyl-N-benzylaminophenyl, N-β-cyanoethyl-N-benzylaminophenyl, N-β-ethoxyethyl-N-benzylaminophenyl, N-β-methoxycarbonylethyl-N-benzylaminophenyl, di-benzylaminochlorophenyl, dibenzylaminomethoxyphenyl, di-benzylaminomethylphenyl, N-methyl-N-β-cyanoethylaminophenyl, N-ethyl-N-β-cyanoethylaminophenyl, N-propyl-N-β-cyanoethylaminophenyl, N-butyl-N-β-cyanoethylaminophenyl, N-methyl-N-β-methoxycarbonylethylaminophenyl, N-methyl-N-β-ethoxycarbonylethylaminophenyl, N-methyl-N-β-carbamylethylaminophenyl, N-methyl-N-β-dimethylcarbamylethylaminophenyl, N-ethyl-N-β-methoxycarbonylethylaminophenyl, N-ethyl-N-β-ethoxycarbonylethylaminophenyl, N-ethyl-N-β-carbamylethylaminophenyl, piperidinophenyl, pyrrolidinophenyl, morpholinophenyl, thiamorpholinophenyl, piperazinophenyl, N-methylpiperazinophenyl, N-benzylpiperazinophenyl, N-methyl-N-phenylaminophenyl, N-cyanoethyl-N-phenylaminophenyl, diphenylaminophenyl, N-methyl-N-4-ethoxyphenylaminophenyl, N-methyl-N-4-methoxyphenylaminophenyl, N-methyl-N-4-methylphenylaminophenyl, N-methyl-N-2-methylphenylaminophenyl, N-methyl-N-cyanomethylaminophenvl, N-ethyl-N-cyanomethylaminophenyl, N-benzyl-N-β-cyanoethylaminophenyl, N-benzyl-N-cyanomethylaminophenyl, N-methyl-N-β-acetoxyethylaminophenyl, N-ethyl-N-β-acetoxyethylaminophenyl, N-benzyl-N-β-propoxyethylaminophenyl, N-ethyl-N-β-hydroxyethylaminophenyl, N-methyl-N-β-hydroxyethylaminophenyl, dimethylaminohydroxyphenyl, diethylaminohydroxyphenyl, dibenzylaminohydroxyphenyl, dimethylaminoacetylaminophenyl, diethylaminoacetylaminophenyl, N-ethyl-N-β-dimethylaminoethylaminophenyl, N-methyl-N-β-dimethylaminoethylaminophenyl, N-benzyl-N-β-dimethylaminoethylaminophenyl, N-β-cyanoethyl-N-β-dimethylaminoethylaminophenyl, N-β-methoxycarbonylethyl-N-β-dimethylaminoethylaminophenyl, N-β-hydroxyethyl-N-β-dimethylaminoethylaminophenyl, N-β-methoxyethyl-N-β-dimethylaminoethylaminophenyl, N-ethyl-N-β-diethylaminoethylaminophenyl, N-ethyl-N-β-dibenzylaminoethylaminophenyl, N-ethyl-N-β-piperidinoethylaminophenyl, N-benzyl-N-β-morpholinoethylaminophenyl, N-ethyl-N-β-trimethylammoniumethylaminophenyl chloride, N-methyl-N-β-trimethylammoniumethylaminophenyl chloride, N-methyl-N-β-diethylbenzylammoniumethylaminophenyl chloride, N-benzyl-N-β-dimethylbenzylammoniumethylaminophenyl chloride, N-ethyl-N-β-pyridiniumethylaminophenyl chloride, dimethylaminonaphthyl, diethylaminonaphthyl, dibenzylaminonaphthyl, tolylmethylaminonaphthyl, ethoxyphenylmethylaminonaphthyl, hydroxynaphthyl, hydroxymethoxycarbonylnaphthyl, methoxycarbonylmethoxynaphthyl,

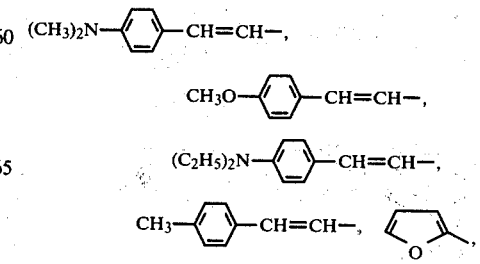

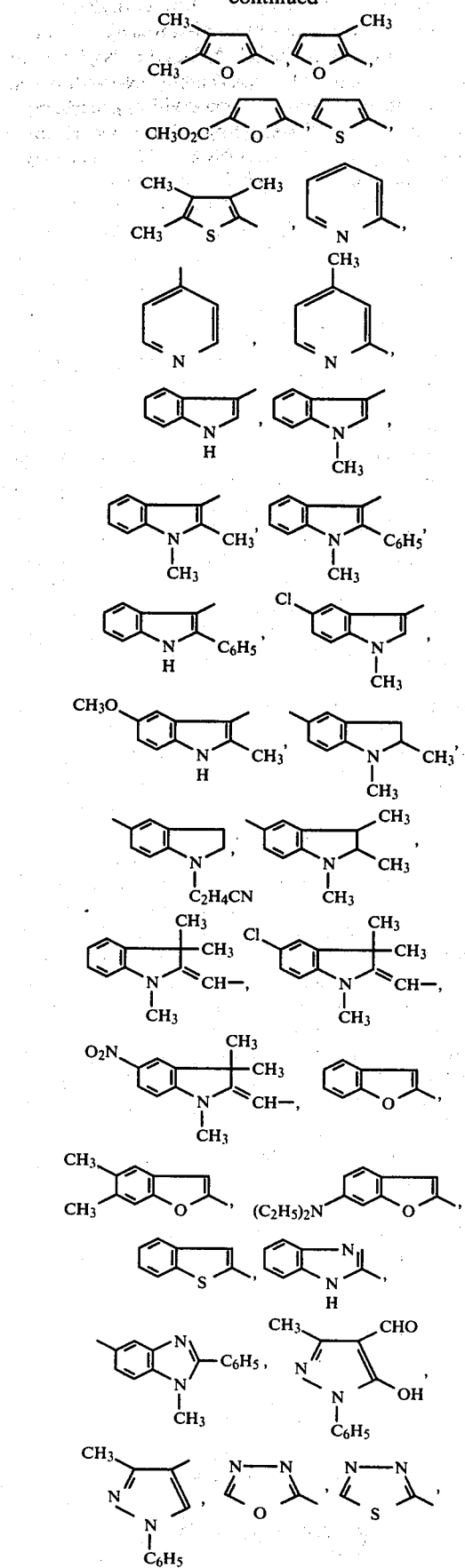

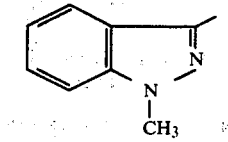
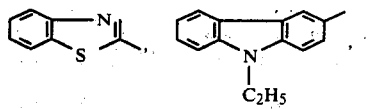
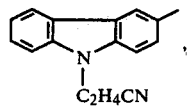
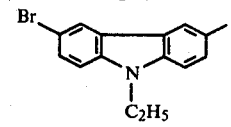
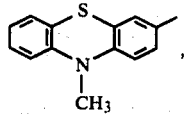
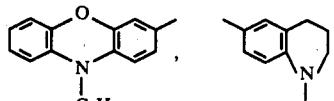
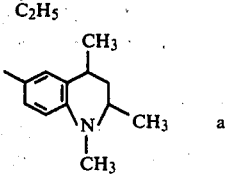
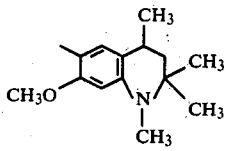

Suitable bridge members X are aliphatic radicals, aromatic radicals and radicals containing hetero-atoms; examples include alkylene which may or may not be interrupted by oxygen, -NH- or sulfur, substituted and unsubstituted phenylene, diphenylene and naphthylene, and saturated cycloalkylene which may or may not contain hetero-atoms. Specific examples of X are:

—CH$_2$—CH$_2$—, —CH$_2$—CH$_2$—CH$_2$—,

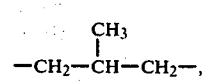

—CH$_2$—CH$_2$—CH$_2$—CH$_2$—,

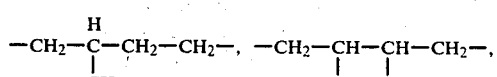

—CH$_2$—CH$_2$—CH$_2$—CH$_2$—CH$_2$—, —CH$_2$—CH$_2$—CH$_2$—CH$_2$—CH$_2$—, —CH$_2$—CH$_2$—O—CH$_2$—CH$_2$—, —CH$_2$—CH$_2$—S—CH$_2$—CH$_2$—,

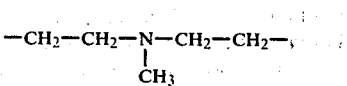

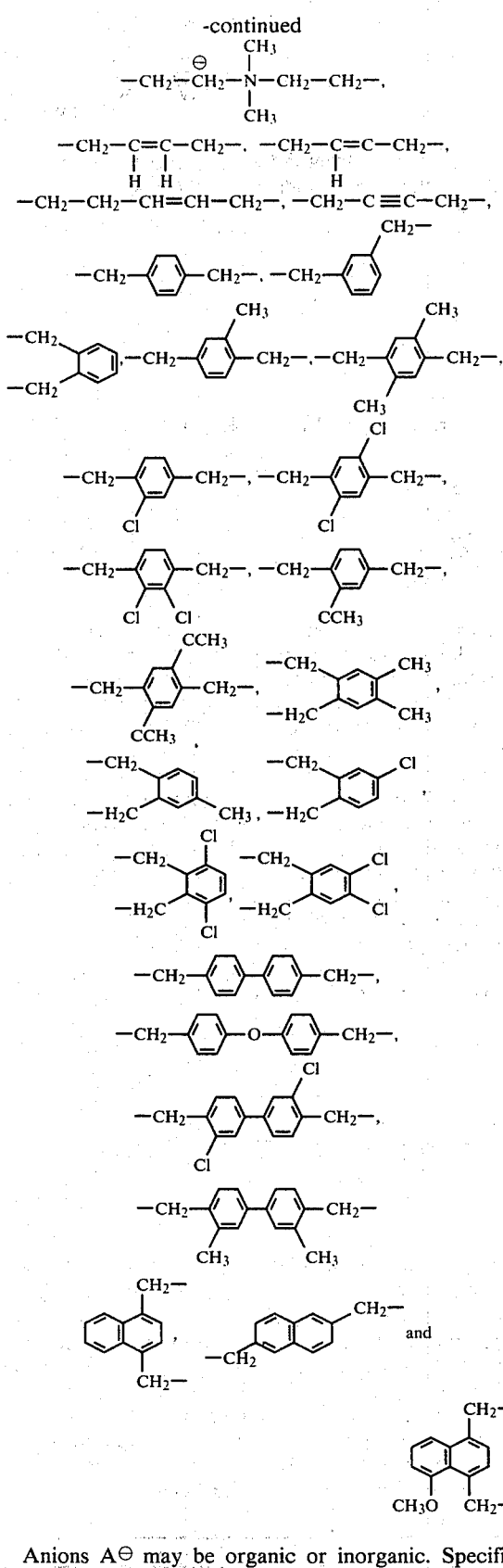

-continued

Anions A⊖ may be organic or inorganic. Specific examples are fluoride, chloride, bromide, iodide, perchlorate, bisulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoborate, acetate, chloroacetate, cyanoacetate, hydroxyacetate, aminoacetate, methylaminoacetate, dichloroacetate, trichloroacetate, 2-chloropropionate, 2-hydroxypropionate, glycollate, thioglycollate, thioacetate, phenoxyacetate, trimethylacetate, valerate, palmitate, acrylate, oxalate, malonate, crotonate, succinate, citrate, methylene-bis-thioglycollate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate and chlorotoluenesulfonate.

A compound of the formula I can be prepared by condensing a compound of the formula II

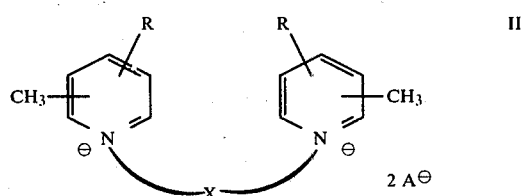

with an aldehyde of the formula III

A—CHO      III or a derivative thereof, eg. an immonium salt.

A compound of the formula II is obtained, for example, by reacting a compound of the formula

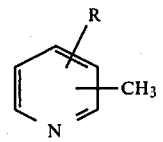

with a compound of the formula

X(Hal)₂ or X(OTos)₂ where Hal is chlorine or bromine and Tos is tolylsulfonyl.

Details of the reactions may be found in the Examples, where parts and percentages are by weight, unless stated otherwise.

The compounds of the formula I are particularly suitable for dyeing paper, but also for dyeing anionically modified fibers. On paper, yellow to bluish red dyeings of the conventional level of fastness are obtained. The novel dimeric dyes are distinguished by great affinity for material containing wood pulp and bleached materials, ie. the great majority of the dye is absorbed on the paper. Hence, the novel compounds cause particularly little pollution of the environment and are economical to use.

Compounds of particular importance are those of the formula Ia

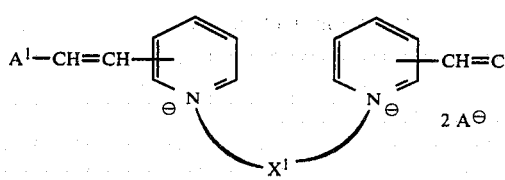

Ia where

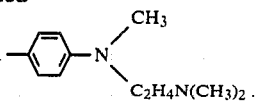

n is preferably from 3 to 6; in the case of xylylene radicals, the p-compounds are preferred.

EXAMPLE 1

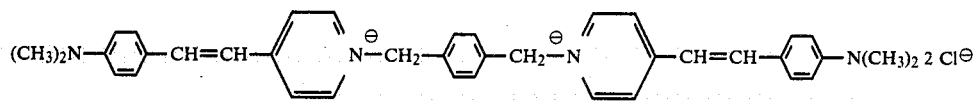

$A^1$ is N,N-disubstituted aminophenyl, indolyl or carbazolyl, which radicals are unsubstituted or substituted by chlorine, methoxy, ethoxy, methyl or ethyl,

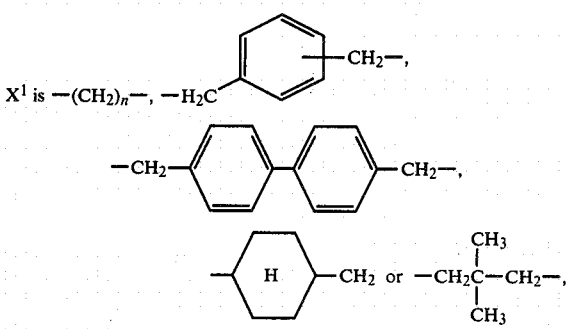

where n is from 2 to 10, and
$A^\ominus$ has the stated meaning.
Examples of preferred aminophenyl radicals are

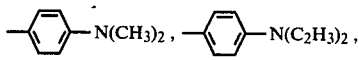

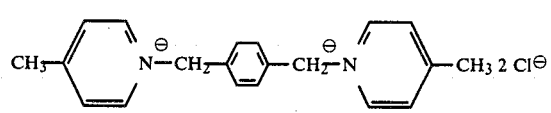

15 parts of p-dimethylaminobenzaldehyde and 9 parts of in 30 parts of 30% strength acetic acid are refluxed for three hours. When the mixture has cooled, the product is filtered off and dried. A red, readily water-soluble dye powder is obtained, which dyes materials containing wood pulp and bleached sulfite cellulose in red hues. The effluent is only slightly colored.

The methylene-active compound employed is prepared as follows: 87.5 parts of p-xylylene dichloride and 93 parts of γ-picoline in 500 parts of ethylene glycol monomethyl ether are slowly heated to the reflux temperature. After boiling for 5 minutes at 130° C., the quaternary salt begins to crystallize. The mixture is stirred for a further 15 minutes, cooled, and diluted with one liter of acetone. The product is then filtered off. 150 parts of a readily water-soluble, colorless product are obtained. Chloride: calculated 19.6%; found 18.6%.

EXAMPLE 2

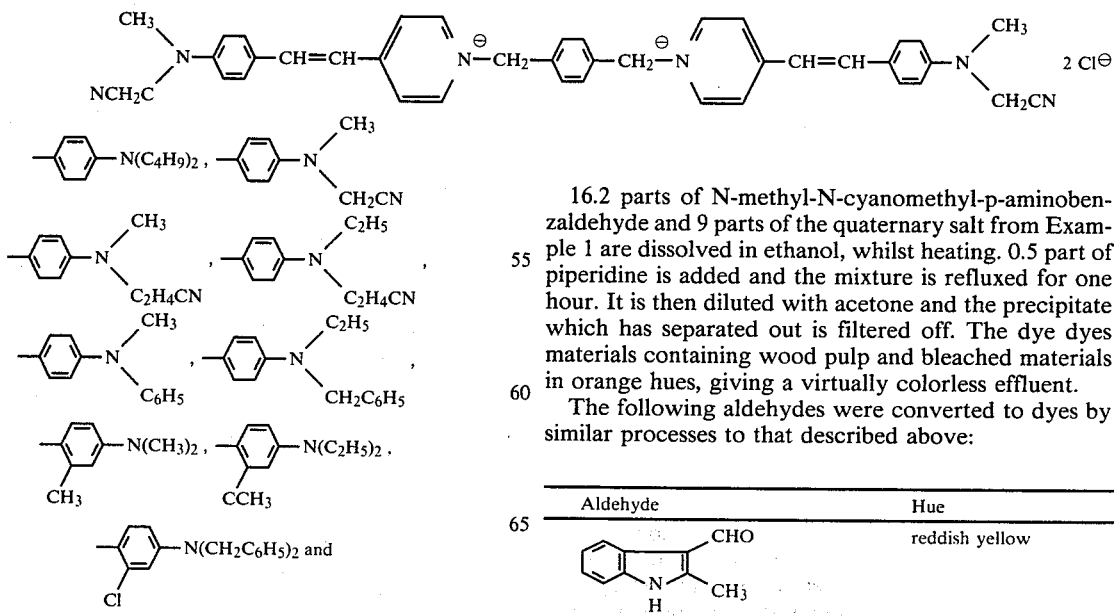

16.2 parts of N-methyl-N-cyanomethyl-p-aminobenzaldehyde and 9 parts of the quaternary salt from Example 1 are dissolved in ethanol, whilst heating. 0.5 part of piperidine is added and the mixture is refluxed for one hour. It is then diluted with acetone and the precipitate which has separated out is filtered off. The dye dyes materials containing wood pulp and bleached materials in orange hues, giving a virtually colorless effluent.

The following aldehydes were converted to dyes by similar processes to that described above:

| Aldehyde | Hue |
|---|---|
| (indole-CHO, N-H, 2-CH3) | reddish yellow |

-continued

| Aldehyde | Hue |
|---|---|
| 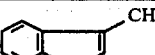 indole-3-CHO | reddish yellow |
| (C₂H₅)₂N–C₆H₄–CHO | red |
| 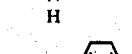 C₆H₅–N(CH₃)–C₆H₄–CHO | orange brown |
| 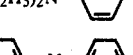 2,2,4-trimethyl dihydroquinoline =CH–CHO | red |
| 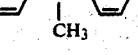 C₆H₅–CH₂–N(CH₃)–C₆H₄–CHO | orange brown |
| (CH₃)₂N–C₆H₃(CH₃)–CHO | red |
| (C₂H₅)₂N–C₆H₃(CH₃)–CHO | red |
| 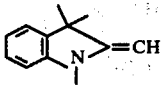 tetrahydroisoquinoline–C₆H₄–CHO | red |
| (C₂H₅)₂N–C₆H₃(CCH₃)–CHO | bluish red |
| H₅C₂(CH₃)₃N⁺H₄C₂–N–C₆H₄–CHO | orange |
| H₅C₂(CH₃)₂N⁺H₄C₂(CH₂C₆H₅)–N–C₆H₄–CHO | orange |
| H₅C₂(CH₃)₂N⁺H₄C₂–N–C₆H₄–CHO | orange |
| CH₃(CH₃)₂N⁺H₄C₂–N–C₆H₄–CHO | orange |

-continued

| Aldehyde | Hue |
|---|---|
| NC–C₂H₄(CH₃)₂N⁺H₄C₂–N–C₆H₄–CHO | orange |
|  N-ethyl carbazole-3-CHO | orange |

EXAMPLE 3

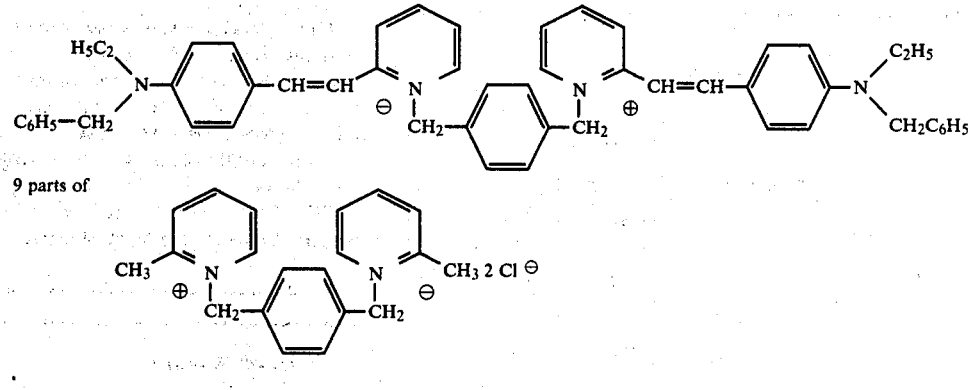

9 parts of and 12 parts of N-ethyl-N-benzyl-p-aminobenzaldehyde in 21 parts of ethylene glycol monomethyl ether and 0.5 part of piperidine are boiled for two hours. The dye solution is packaged. It dyes paper in orange hues. The quaternary salt used was prepared from p-xylylene dichloride and α-picoline by the method described in Example 1.

If the aldehydes shown below are employed and the condensation products are used to dye paper, the hues listed below are obtained:

| Aldehyde | Hue |
|---|---|
| (CH₃)₂N–C₆H₃(CH₃)–CHO | orange brown |
| (H₅C₂)₂N–C₆H₃(OCH₃)–CHO | brown |
| H₅C₂(CH₃)₃N⁺H₄C₂–N–C₆H₄–CHO | orange |
| H₅C₂(CH₃)₂N⁻H₄C₂–N–C₆H₄–CHO with CH₂C₆H₅ | orange |
| H₅C₂(CH₃)₂N⁺H₄C₂–N–C₆H₄–CHO | orange |
|  N-ethyl carbazole-3-CHO | yellow |

| Aldehyde | Hue |
|---|---|
| 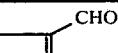 (indole-3-CHO) | yellow |
| $(CH_3)_2N$—⌬—CHO | red |
| $(C_2H_5)_2N$—⌬—CHO | red |
|  (N-methyl-N-phenyl-p-aminobenzaldehyde) | brown |

EXAMPLE 4

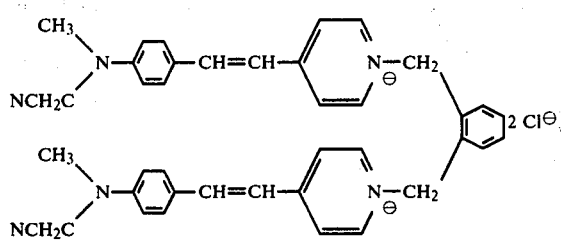
2 Cl⊖

9 parts of the quaternary salt of the formula

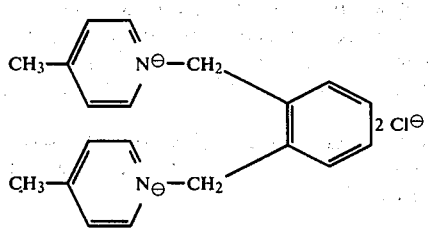
2 Cl⊖ and 16.2 parts of N-methyl-N-cyanomethyl-p-aminobenzaldehyde are dissolved in ethanol and after adding 0.5 ml of piperidine the mixture is boiled for 2 hours. After dilution with acetone, filtering off the product and drying it, 25 parts of a dye of melting point 110°–112° C., with decomposition, are obtained; the dye gives orange hues on materials containing wood pulp and bleached sulfite cellulose. The effluent has only a pale color.

The methylene-active component was obtained by reacting equimolar amounts of o-xylylene dichloride and γ-picoline in methyl glycol. Melting point 245° C. (with decomposition), yield 70%, chloride calculated 19.6%, found 19%.

If the aldehyde from Example 1 or the aldehyde from Example 3 is employed, paper dyes with similar properties are obtained.

EXAMPLE 5

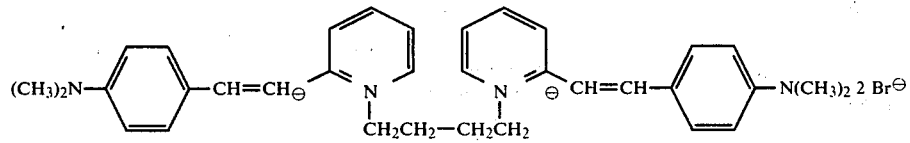

15 parts of p-dimethylaminobenzaldehyde an 20.1 parts of the quaternary salt of the formula

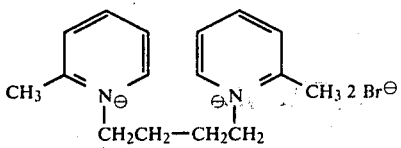

in 50 parts of ethylglycol are refluxed for 1 hour, using piperidine as the catalyst. After the mixture has cooled, the precipitate which has formed is filtered off, washed with methanol and dried.

20 parts of a dye which gives orange hues on paper are obtained.

The quaternary salt was prepared as follows: 37 parts of α-picoline and 43 parts of 1,4-dibromobutane in 100 parts of ethylene glycol monomethyl ether are refluxed for 5 hours. When the mixture has cooled, it is diluted with acetone and the product is filtered off. 64 parts of a water-soluble substance of melting point 254°–256° C. are obtained.

The Table shows the hues of the dyes which are obtained by using other aldehydes:

| Aldehyde | Hue |
|---|---|
| $(C_2H_5)_2N$—⌬—CHO | orange |
| indole-3-CHO (NH) | yellow |
| carbazole-3-CHO (N-$C_2H_5$) | yellow |
| $(C_2H_5)_2N$—⌬(OCH_3)—CHO | orange red |
| $(CH_3)_3N^\oplus$—$C_2H_4$—N($C_2H_5$)—⌬—CHO | yellow |
| $(CH_3)_2N^\oplus$—CH(CH_2C_6H_5)—N($C_2H_5$)—⌬—CHO | yellow |
| $(CH_3)_2N$—$C_2H_4$—N($C_2H_5$)—⌬—CHO | yellow |
| NC—$CH_2$—N($CH_3$)—⌬—CHO | yellow |

Dyes with similar performance characteristics are obtained by employing the following quaternary salts:

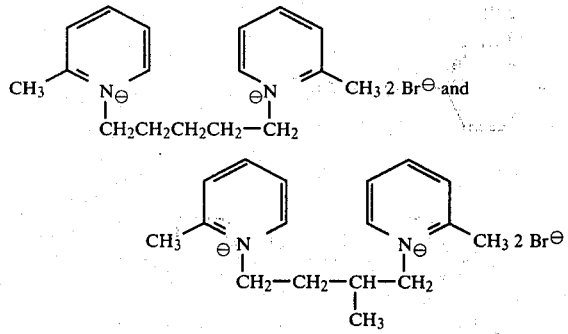

EXAMPLE 6

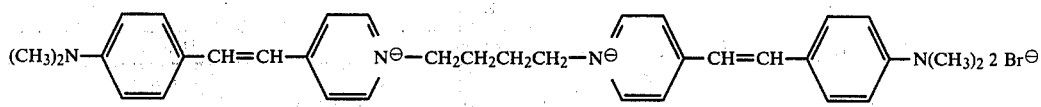

20 parts of the methylene-active compound of the formula

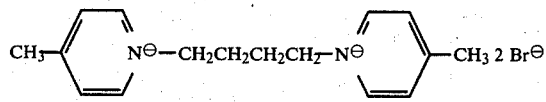

and 15 parts of p-dimethylaminobenzaldehyde in 50 parts of ethylene glycol, containing added piperidine, are refluxed for five minutes. When the mixture has cooled, it is filtered. 20 parts of product, of melting point 297°–299° C., are obtained. When used for wet-end coloring, the product gives paper of a red hue, and the effluent contains little dye.

Similar dyes are obtained by using the aldehydes listed in the Table which follows.

| Aldehyde | Hue |
|---|---|
| 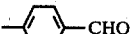 | red |
|  | reddish brown |
| 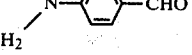 | yellow |
| 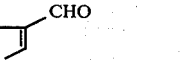 | reddish yellow |
| 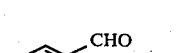 | bluish red |

-continued

| Aldehyde | Hue |
|---|---|
| 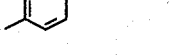 (CH$_3$)$_3$N$^{\oplus}$—C$_2$H$_4$—N—C$_6$H$_4$—CHO, C$_2$H$_5$ | orange |
| C$_6$H$_5$CH$_2$—N$^{\oplus}$(CH$_3$)$_2$—C$_2$H$_4$—N—C$_6$H$_4$—CHO, C$_2$H$_5$ | orange |
| (CH$_3$)$_2$N—C$_2$H$_4$—N—C$_6$H$_4$—CHO, C$_2$H$_5$ | orange |
| NC—CH$_2$—N(CH$_3$)—C$_6$H$_4$—CHO | yellow |

Dyes with similar properties are obtained by employing the following compounds for quaternizing the γ-picoline:

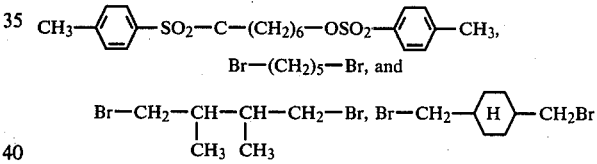

EXAMPLE 7

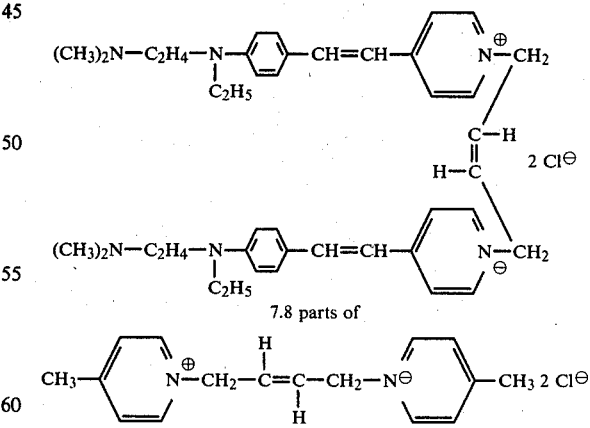

and 11 parts of N-ethyl-N-β-dimethylaminoethyl-p-aminobenzaldehyde in 50 parts of ethanol, to which 1 ml of piperidine has been added, are refluxed for three hours. The dye solution is packaged. The product gives red hues on paper.

EXAMPLE 8

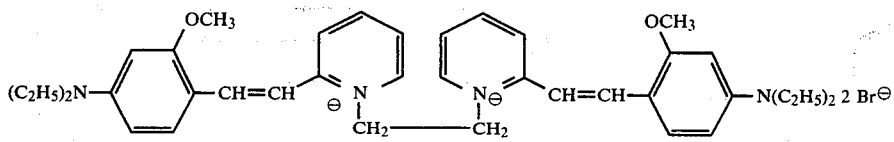

20.7 parts of 2-methoxy-4-diethylaminobenzaldehyde, 18.7 parts of the quaternary salt of the formula

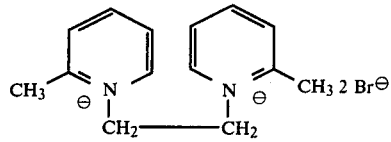

and 40 parts of ethylglycol are briefly refluxed in the presence of two parts of piperidine. The mixture is cooled and the dye is purified by trituration with acetone.

14 parts of a product of melting point 295° C., with decomposition, are obtained; on paper, the dyes gives bluish red hues.

The following products were obtained by a similar method:

| Aldehyde | Hue |
|---|---|
| indole-3-CHO (N–H) | yellow |
| carbazole-CHO (N–C$_2$H$_5$) | reddish yellow |
| H$_5$C$_2$—N(C$_6$H$_4$)—CH=O with (CH$_3$)$_2$N$^\oplus$—H$_4$C$_2$ / CH$_2$C$_6$H$_5$ | orange |
| H$_5$C$_2$—N(C$_6$H$_4$)—CHO with (CH$_3$)$_2$N—C$_2$H$_4$ | orange |

EXAMPLE 9

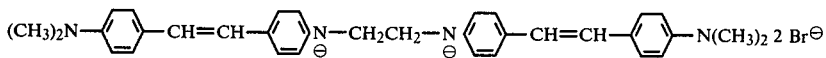

15 parts of p-dimethylaminobenzaldehyde and 18.7 parts of $$CH_3\text{–}\langle C_6H_4\rangle\text{–}\overset{\ominus}{N}\text{–}C_2H_4\text{–}\overset{\ominus}{N}\langle C_6H_4\rangle\text{–}CH_3 \quad 2\ Br^\ominus$$

in 40 parts of ethylene glycol and 2 parts of piperidine are boiled for one hour. The product is filtered off, washed with alcohol and dried. Yield: 15 parts. On paper, the dye gives bluish red hues.

Using a similar method, the following aldehydes were employed:

| Aldehyde | Hue |
|---|---|
| (C$_2$H$_5$)$_2$N—C$_6$H$_4$—CHO | bluish red |
| H$_5$C$_3$,C$_6$H$_5$—H$_2$C–N–C$_6$H$_3$(Cl)—CHO | red |
| (CH$_3$)$_2$N—C$_6$H$_3$(CH$_3$)—CHO | brown |
| indole-3-CHO (N–H) | reddish yellow |
| carbazole-CHO (N–C$_2$H$_5$) | orange |
| H$_5$C$_2$—N(C$_6$H$_4$)—CHO with (C$_2$H$_5$)$_2$NH$_4$C$_2$ | orange |
| CH$_3$—N(C$_6$H$_4$)—CHO with (CH$_3$)$_2$N$^\ominus$—C$_2$H$_4$ / CH$_2$C$_6$H$_5$ | yellowish red |
| H$_5$C$_2$—N(C$_6$H$_4$)—CHO with (CH$_3$)$_2$N—C$_2$H$_4$ | red |

EXAMPLE 10

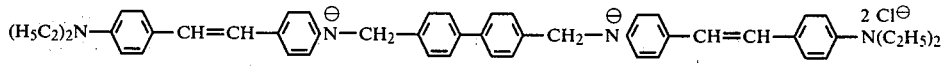

11 parts of the quaternary salt of the formula

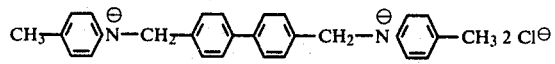

and 9 parts of p-dimethylaminobenzaldehyde in 50 parts of ethanol, to which one part of piperidine is added, are refluxed for three hours. The mixture is poured into 500 parts of acetone and the product is filtered off. Yield: 13 parts; melting point 230°–232° C.

Cellulose-containing wood pulp, and bleached sulfite cellulose, are dyed red by this product. With both materials, the dye is fully exhausted.

The quaternary salt used is prepared as follows:
126 parts of 4,4'-bis-chloromethylbiphenyl and 93 parts of γ-picoline in 200 parts of ethylene glycol monomethyl ether are slowly heated to 80°–90° C. At that stage, the temperature rises rapidly, so that heating must be discontinued. When the exothermic reaction has ended, the mixture is refluxed for a further two hours, cooled and diluted with 1,500 parts of acetone. The product is filtered off and washed with acetone. Yield: 126 parts, melting point 306°–308° C.

The following aldehydes were reacted by a similar method:

| Aldehyde | Color |
|---|---|
| (CH₃)₂N—C₆H₄—CHO | red |
| NCCH₂N(CH₃)—C₆H₄—CHO | yellowish brown |
| indole-3-CHO (N–H) | yellow |
| carbazole-CHO (N–C₂H₅) | yellowish brown |

Dyes with good substantivity were also obtained from the aldehydes of Example 2 and the following quaternary salts:

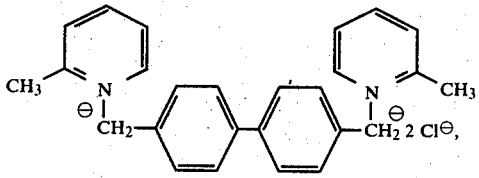

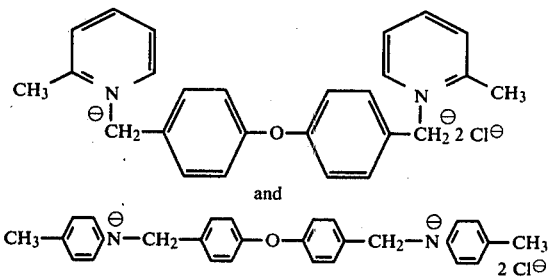

and

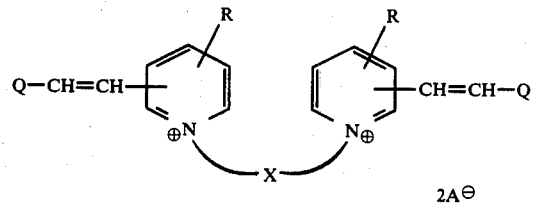

What is new and intended to be covered by Letters Patent is:

1. A method of dyeing paper and anionically modified fibers which comprises contacting said paper or anionically modified fibers with a dye of the formula $$Q-CH=CH-\underset{\underset{N^\oplus}{|}}{\overset{R}{\diagup}}\cdots\underset{\underset{N^\oplus}{|}}{\overset{R}{\diagup}}-CH=CH-Q \quad 2A^\ominus$$

$$\underbrace{\qquad X \qquad}$$

wherein the groups Q are the same or different substituted or unsubstituted aryl or hetaryl radicals, A is an organic or inorganic anion;

R is selected from the group consisting of hydrogen, methyl or ethyl;

X represents a bridge member selected from the group consisting of aliphatic, aromatic and heteroaromatic radicals, and wherein the methine groups are in the α- or γ-position.

2. The method of claim 1, wherein Q is selected from the group consisting of N,N-disubstituted aminophenyl, indolyl and carbazolyl, wherein said radicals are substituted or unsubstituted by chlorine, methoxy, ethoxy, methyl or ethyl; and X is selected from the group consisting of $-(CH_2)_n-$;

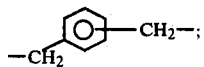

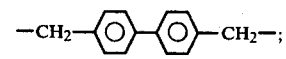

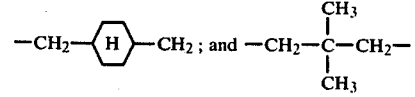

wherein n = 2–10.

* * * * *